United States Patent
Bergerhoff et al.

[15] 3,681,435
[45] Aug. 1, 1972

[54] PHENYL-SUBSTITUTED PHOSPHOROUS COMPOUND AND PROCESS FOR ITS PREPARATION

[72] Inventors: Gunter Bergerhoff, Lengsdorf; Bela Tihanyi, Bonn; Jurgen Falbe, Dinslaken; Jurgen Weber, Oberhausen-Holten, all of Germany

[73] Assignee: Ruhrchemie Aktiengesellschaft, Oberhausen-Holten, Germany

[22] Filed: Oct. 7, 1968

[21] Appl. No.: 765,687

[30] Foreign Application Priority Data

Oct. 13, 1967 Germany..............P 16 68 614.9

[52] U.S. Cl..............260/475 SC, 252/400, 252/426, 252/430, 424/204
[51] Int. Cl...............................................C07f 9/50
[58] Field of Search......................260/485 J, 475 SC

[56] References Cited

UNITED STATES PATENTS

3,531,514   9/1970   Redmore.................260/475 SC

OTHER PUBLICATIONS

Lippincott, J.O.P.S., Vol. XLV, No. 5 (1963) pp. 380,391,392,395,400,401,402,403,404,412–414.

*Primary Examiner*—Lorraine A. Weinberger
*Assistant Examiner*—E. Jane Skelly
*Attorney*—Burgess, Dinklage & Sprung

[57] ABSTRACT

A phenyl-substituted phosphorous compound is produced by reaction of malonic acid diethylester with phenylphosphine dichloride. Apparently, two moles of each of the reactants, under elimination of four moles of hydrogen chloride, form the compound. The compound is useful as pest control agents.

7 Claims, No Drawings

PHENYL-SUBSTITUTED PHOSPHOROUS COMPOUND AND PROCESS FOR ITS PREPARATION

The present invention relates to a novel phenyl-substituted phosphorous compound and a process for its preparation.

It has been found, that a novel phenyl-substituted phosphorous compound can be prepared with favorable results, if malonic acid diethylester is reacted with phenylphosphine dichloride in presence of a base and preferably in an organic solvent and the phosphorous compound thereby formed is separated from the hydrochloric acid salt of the base by fractional crystallization or extraction.

In one embodiment of the said process, hexane is preferentially used as reaction medium. It dissolves the starting materials but not the reaction products. Following the reaction, the hexane is removed and the remaining residue is extracted with a suitable solvent, preferably benzene, wherefrom the phenyl-substituted phosphorous compound can be isolated.

According to another embodiment of the said process, benzene, which dissolves the starting materials and the phenyl-substituted phosphorous compound formed by the reaction, is used as solvent and the precipitated hydrochloric acid salt of the base is separated, washed out and the phenyl-substituted phosphorous compound is isolated from the solution thereby obtained by evaporation and recrystallization.

The phenyl-substituted phosphorous compound of the process according to the invention proved especially useful as catalyst component. It has been observed that it can be applied with good results for the stabilization of complexes of transition metals, especially of nickel and palladium, which are known as hydrogenation catalysts. Furthermore the novel phosphorous compound can also be used as catalyst component at the preparation of carboxylic acid esters by reaction of olefins with carbon monoxide and alcohols. It is much interesting, that the novel phosphorous compound is also characterized by pesticidal activity. It is for instance suitable for combatting flies (musca domestica).

Of particular importance is the oxidation inhibiting efficiency of the novel compound, as is seen from the following comparison:

Through 159,5 g n-butyraldehyde were passed 31 l air during 30 minutes, whereby 15,6 g butyric acid were formed.

Under similar conditions, but with addition of 3,2 g of the novel phosphorous compound, only 2 g butyric acid were formed.

The following data could be determined. Melting point: 114° C, molecular weight: 532. The novel compound is soluble in benzene, acetone, acetic acid ethylester, but difficult to dissolve in benzine, ether, alcohol.

100 g of the below listed solvents dissolve the hereinafter stated amounts of the novel compound at 20° C and 50° C respectively.

|  | 20°C | 50°C |
|---|---|---|
| acetic acid ethylester | 1,6 g | 7,1 g |
| acetone | 10,9 g | 38,5 g |
| benzene | 11,0 g | 34,0 g |

The mass spectrum of the novel phosphorous compound was recorded at 70° C, 300 mA and 70 eV with the aid of a conventional mass spectrograph (commercially available under the designation "MS-CH4/TO4"), with introduction of the material to be analyzed directly into the ion source.

The mass spectrum of the novel compound shows a mole-peak with three satellites at $M_{532}$ (50 percent relative intensity). This mass confirms the formula $C_{26}H_{30}P_2O_8$. The intensity of the first satellite of about $0,3 \cdot M_{532}$ confirms also the number of carbon atoms in the molecule. The most intensive fragment is $M_{141}$ (100 percent relative intensity).

The composition of eighteen masses has been determined by high-resolution (see the attached table).

It shows the infrared adsorption bands at:

| | |
|---|---|
| 692 cm$^{-1}$ | 1305 cm$^{-1}$ |
| 717 cm$^{-1}$ | 1362 cm$^{-1}$ |
| 744 cm$^{-1}$ | 1390 cm$^{-1}$ |
| 757 cm$^{-1}$ | 1442 cm$^{-1}$ |
| 768 cm$^{-1}$ | 1635 cm$^{-1}$ |
| 958 cm$^{-1}$ | 1735 cm$^{-1}$ |
| 1025 cm$^{-1}$ | 1765 cm$^{-1}$ |
| 1112 cm$^{-1}$ | 3000 cm$^{-1}$ |
| 1230 cm$^{-1}$ | |

By analysis and molecular weight it appears to be proved, that two moles phenyl-phosphine dichloride react with two moles malonic acid diethylester under elimination of four moles hydrogen chloride.

EXAMPLE 17.9 g phenyl-phosphine dichloride (0.1 mole) and 16.0 g malonic acid diethylester (0.1 mole) are dissolved in 250 ml benzene and heated to 50° C under a nitrogen atmosphere. 20.2 g (0.2 mole) triethylamine, dissolved in 100 ml benzene are added dropwise under stirring. Precipitated triethylamine hydrochloride is separated by filtration and washed with benzene. The benzene filtrate together with the washing solution is concentrated to about one third of its volume by evaporation at 40° to 50° C under water-jet vacuum. Thereby a colorless crystal sludge is precipitated which is sucked off and washed with ether. This product can be purified by recrystallization from benzene followed by washing with alcohol and ether. The pure compound has a melting point of 114° C. The entire yield amounts to 70 to 80 percent by theory.

Analysis: $C_{26}H_{30}O_8P_2$/molecular wt.: 532 (determined by mass spectrometry)

$C_{calc.}$ 58,6  $C_{det.}$ 59,39; 58,2
$H_{calc.}$ 5,64  $H_{det.}$ 5,61; 5,92
$P_{calc.}$ 11,64  $P_{det.}$ 12,30; 11,69

TABLE

| exact mass | composition | distribution in % |
|---|---|---|
| 1.) 532,1406 | $C_{26}H_{30}O_8P_2$ | 100 |
| 2.) 503,1021 | $C_{24}H_{25}O_8P_2$ | 100 |
| 3.) 487,1062 | $C_{24}H_{25}O_7P_2$ | 100 |
| 4.) 459,1132 | $C_{23}H_{25}O_6P_2$ | 57 |
| 459,0760 | $C_{22}H_{21}O_7P_2$ | 43 |
| 5.) 431,0810 | $C_{21}H_{21}O_6P_2$ | 76 |
| 431,0421 | $C_{20}H_{17}O_7P_2$ | 10 |
| 431,1174 | $C_{22}H_{25}O_5P_2$ | 14 |
| 6.) 408,1343 | $C_{20}H_{25}O_7P$ | 100 |
| 7.) 379,0946 | $C_{18}H_{20}O_7P$ | 100 |
| 8.) 311,1046 | $C_{15}H_{20}O_5P$ | 62 |
| 311,0550 | $C_{17}H_{11}O_6$ | 31 |
| 311,0113 | $C_{16}H_8O_5P$ | 7 |

| | | | |
|---|---|---|---|
| 9.) | 305,0215 | $C_{14}H_{10}O_6P$ | 95 |
| 10.) | 283,0728 | $C_{13}H_{16}O_5P$ | 85 |
| | 283,0240 | — — — | 15 |
| 11.) | 266,0708 | $C_{13}H_{15}O_4P$ | 85 |
| | 266,0238 | $C_{12}H_{12}O_3P_2$ | 15 |
| 12.) | 169,0412 | $C_8H_{10}O_2P$ | 100 |
| 13.) | 165,0703 | $C_8H_{14}O_3P$ | 100 |
| 14.) | 153,0465 | $C_8H_{10}OP$ | 100 |
| 15.) | 141,0099 | $C_6H_6O_2P$ | 100 |
| 16.) | 125,0151 | $C_6H_6OP$ | 100 |
| 17.) | 109,0200 | $C_6H_6P$ | 45 |
| | 109,0045 | $C_2H_6O_3P$ | 36 |
| | 109,0646 | $C_7H_9O$ | 9 |
| | 109,1006 | $C_8H_{13}$ | 9 |
| 18.) | 46,9687 | OP | 100 |

What is claimed is:

1. A process for the preparation of a phenyl-substituted phosphorous compound, which comprises contacting malonic acid diethylester with phenylphosphine dichloride in the presence of a tertiary amine base for reaction of the malonic acid diethylester and the phenylphosphine to form said compound.

2. Process according to claim 1, wherein said contacting is in an organic reaction medium which is a solvent for the malonic acid diethylester and phenylphosphine dichloride.

3. Process according to claim 2, wherein the phenyl-substituted phosphorous compound is recovered from the reaction medium.

4. Process according to claim 2, wherein said reaction medium is hexane, the phenyl-substituted phosphorous compound forming a precipitate in the reaction medium, separating the precipitate from the reaction medium, dissolving the precipitate in a solvent therefor, and recovering the phenyl-substituted compound from said solvent.

5. Process according to claim 2, wherein said reaction medium is benzene, the reactants and phenyl-substituted compound dissolving in the benzene, and hydrochloride salt of said base forming as a precipitate in the benzene, separating the precipitate, washing the precipitate, and recovering phenyl-substituted phosphorous compound from the wash effluent liquor.

6. Process according to claim 1, for the preparation of a phenyl-substituted phosphorous compound, which comprises contacting malonic acid diethylester with phenyl phosphine dichloride in a 1:1 molar proportion, the contacting temperature being 50° C, in the presence of a triethylamine base, the contacting being performed in the presence of benzene as a reaction medium.

7. The phenyl-substituted phosphorous compound produced by the method of claim 1.

* * * * *